(12) United States Patent
Kunieda et al.

(10) Patent No.: US 8,394,347 B2
(45) Date of Patent: Mar. 12, 2013

(54) EXHAUST GAS CONVERSION SYSTEM AND EXHAUST GAS CONVERSION METHOD

(75) Inventors: Masafumi Kunieda, Gifu (JP); Shigeaki Goto, Gifu (JP)

(73) Assignee: Ibiden Co., Ltd., Ogaki-shi (JP)

( * ) Notice: Subject to any disclaimer, the term of this patent is extended or adjusted under 35 U.S.C. 154(b) by 0 days.

(21) Appl. No.: 13/314,102

(22) Filed: Dec. 7, 2011

(65) Prior Publication Data

US 2012/0251419 A1     Oct. 4, 2012

(30) Foreign Application Priority Data

Mar. 29, 2011  (WO) ............... PCT/JP2011/057856

(51) Int. Cl.
*B01D 53/92* (2006.01)
*B01D 53/94* (2006.01)
*F01N 3/10* (2006.01)
*F01N 3/24* (2006.01)
*F01N 3/035* (2006.01)

(52) U.S. Cl. ............... 423/212; 423/213.2; 423/213.5; 423/215.5; 423/239.1; 422/171; 422/172; 422/177; 422/181; 60/299; 60/301

(58) Field of Classification Search ............ 423/212, 423/213.2, 213.5, 215.5, 239.1; 422/171, 422/172, 177, 181; 60/299, 301
See application file for complete search history.

(56) References Cited

U.S. PATENT DOCUMENTS

| 6,805,849 | B1 * | 10/2004 | Andreasson et al. ...... 423/239.1 |
| 2009/0169451 | A1 * | 7/2009 | Andreasson et al. ...... 423/213.2 |
| 2009/0291834 | A1 | 11/2009 | Ohno et al. |
| 2009/0291836 | A1 * | 11/2009 | Ohno et al. ................. 502/68 |
| 2010/0242426 | A1 | 9/2010 | Ohara et al. |
| 2011/0116982 | A1 * | 5/2011 | Kunieda et al. ............ 422/177 |

FOREIGN PATENT DOCUMENTS

| JP | 2000-303826 | 10/2000 |
| JP | 2010-227755 | 10/2010 |
| JP | 2011-012643 | 1/2011 |
| WO | 2009/141898 | 11/2009 |

* cited by examiner

*Primary Examiner* — Timothy Vanoy
(74) *Attorney, Agent, or Firm* — Ditthavong Mori & Steiner, P.C.

(57) ABSTRACT

An exhaust gas conversion system includes an oxide catalyst, a filter, a selective catalytic reduction catalyst and an ammonia supplying device. The filter has a honeycomb structural body including a honeycomb unit. The selective catalytic reduction catalyst has a honeycomb structural body including a honeycomb unit. The oxide catalyst, the filter and the selective catalytic reduction catalyst are sequentially arranged in a direction in which an exhaust gas flows. A ratio of an area of a cross section of the selective catalytic reduction catalyst perpendicular to a longitudinal direction of the selective catalytic reduction catalyst with respect to an area of a cross section of the filter perpendicular to a longitudinal direction of the filter is approximately 0.55 or more and approximately 0.90 or less. The area of the cross section of the filter is approximately 300 $cm^2$ or more and approximately 1000 $cm^2$ or less.

52 Claims, 3 Drawing Sheets

EXHAUST GAS CONVERSION SYSTEM AND EXHAUST GAS CONVERSION METHOD

CROSS-REFERENCE TO RELATED APPLICATION

The present application claims priority under 35 U.S.C. §119 to International Application No. PCT/JP2011/057856, filed on Mar. 29, 2011. The contents of this application are incorporated herein by reference in their entirety.

BACKGROUND OF THE INVENTION

1. Field of the Invention

The present invention relates to an exhaust gas conversion system and an exhaust gas conversion method.

2. Discussion of the Background

Conventionally, as one of the automotive exhaust gas converting systems, an SCR (Selective Catalytic Reduction) system has been known in which NOx is reduced to nitrogen and water by using ammonia.

In the SCR system, zeolite is known as a material for absorbing ammonia.

In Japanese Laid-Open Patent Publication No. 2000-303826, an exhaust gas conversion apparatus is disclosed. The exhaust gas conversion apparatus in Japanese Laid-Open Patent Publication No. 2000-303826, which includes an apparatus having an SCR catalyst for reducing NOx provided in a exhaust path of a diesel engine, a DOC (Diesel Oxidation Catalyst) and a DPF (Diesel Particulate Filter) serially provided in this order from an upstream side of the SCR catalyst, supplies and ejects ammonia from an exhaust path between the DPF and the SCR catalyst.

The contents of Japanese Laid-Open Patent Publication No. 2000-303826 are incorporated herein.

SUMMARY OF THE INVENTION

According to one aspect of the present invention, an exhaust gas conversion system includes an oxide catalyst, a filter, a selective catalytic reduction catalyst and an ammonia supplying device. The filter has a honeycomb structural body including a honeycomb unit having a plurality of through holes divided by partition walls and arranged in a longitudinal direction of the honeycomb unit. The plurality of through holes are sealed on one end of the honeycomb unit in the longitudinal direction. The selective catalytic reduction catalyst has a honeycomb structural body including a honeycomb unit having a plurality of through holes divided by partition walls and arranged in a longitudinal direction of the honeycomb unit. The oxide catalyst, the filter and the selective catalytic reduction catalyst are sequentially arranged in a direction in which an exhaust gas flows in an exhuast path of a diesel engine. The ammonia supplying device is positioned between the filter and the selective catalytic reduction catalyst and configured to supply ammonia. A ratio of an area of a cross section of the selective catalytic reduction catalyst perpendicular to a longitudinal direction of the selective catalytic reduction catalyst with respect to an area of a cross section of the filter perpendicular to a longitudinal direction of the filter is approximately 0.55 or more and approximately 0.90 or less. The area of the cross section of the filter perpendicular to the longitudinal direction of the filter is approximately 300 $cm^2$ or more and approximately 1000 $cm^2$ or less.

According to another aspect of the present invention, an exhaust gas conversion method includes converting an exhaust gas by using the exhaust gas conversion system.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
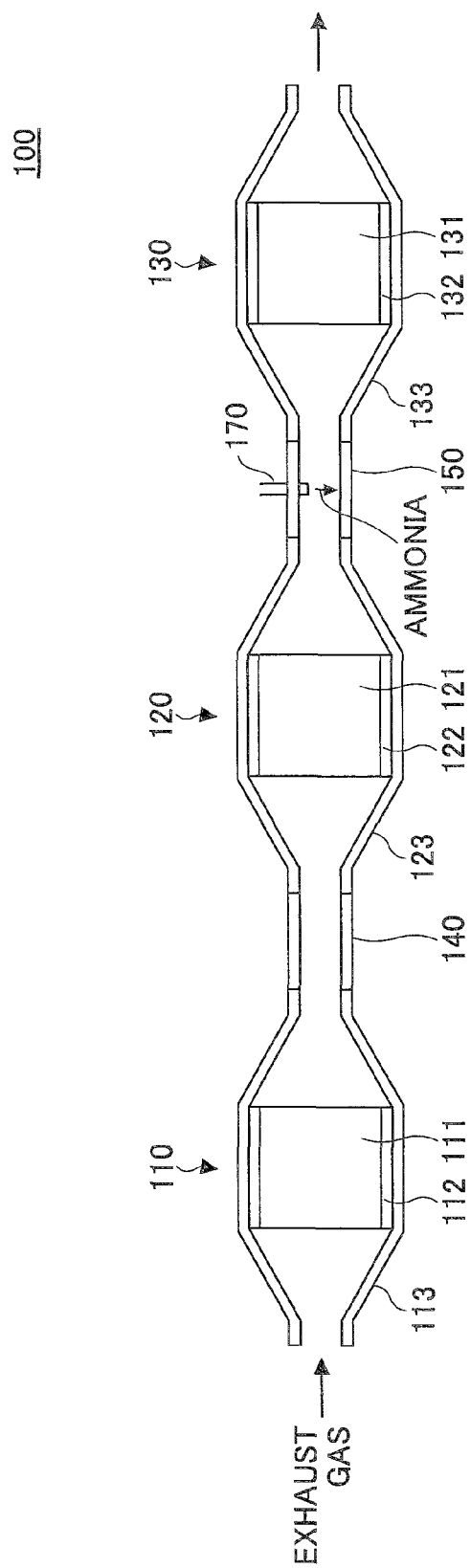
FIG. 1 is a schematic diagram illustrating an example of an exhaust gas conversion system according to an embodiment of the present invention.

With an embodiment of the present invention, it is possible to obtain an exhaust gas conversion system and an exhaust gas conversion method that enable reduction of the space for positioning the exhaust gas conversion apparatus while maintaining NOx conversion efficiency.

The embodiments will now be described with reference to the accompanying drawings, wherein like reference numerals designate corresponding or identical elements throughout the various drawings.

FIG. 1 illustrates an example of an exhaust gas conversion system according to an embodiment of the present invention. The exhaust gas conversion system 100 has exhaust gas conversion apparatuses 110, 120, and 130 that are connected via pipes 140 and 150. In this example, the exhaust gas conversion apparatus 110 can be manufactured by installing (e.g., canning) a DOC (Diesel Oxidation Catalyst) 111 in a metal container (shell) 113 in a state where a holding sealing member 112 is provided at an outer peripheral part of the DOC 111. Further, the exhaust gas conversion apparatus 120 can be manufactured by installing (e.g., canning) a DPF (Diesel Particulate Filter, also simply referred to as "filter") 121 in a metal container 123 in a state where a holding sealing member 122 is provided at an outer peripheral part of the DPF 121. Further, the exhaust gas conversion apparatus 130 can be manufactured by installing (e.g., canning) an SCR (Selective Catalytic Reduction) catalyst 131 in a metal container 133 in a state where a holding sealing member 132 is provided at an outer peripheral part of the SCR catalyst 131. Thereby, the exhaust gas conversion system 100 can convert the exhaust gas of a diesel engine.

Further, the exhaust gas conversion system 100 has an ammonia supply part 170 inside the pipe 150 provided between the exhaust gas conversion apparatus 120 and the exhaust gas conversion apparatus 130. The ammmonia supply part 170 is, for example, an injection nozzle for injecting ammonia or a compound that generates ammonia by being decomposed. By supplying ammonia into the pipe 150 with the ammonia supply part, the SCR catalyst 131 reduces NOx contained in an exhaust gas.

The compound that generates ammonia by being decomposed is not limited in particular as long as the compound can generate ammonia by being heated with exhaust gas inside the pipe 150. However, it is preferable for the compound to be urea water because urea water has satisfactory storage stability.

Thus, urea water generates ammonia by being heated with exhaust gas and being hydrolyzed inside the pipe 150.

In the exhaust gas conversion system 100, the ratio of an area of a cross section of the SCR catalyst 131 perpendicular to a longitudinal direction of the SCR catalyst 131 with respect to an area of a cross section of the DPF 121 perpendicular to a longitudinal direction of the DPF 121 is approximately 0.55 to approximately 0.90. Therefore, it becomes easy for ammonia to be dispersed in a radial direction (i.e. toward the outer peripheral part) of the SCR catalyst 131 without maintaining a sufficient distance between the DPF 121 and the SCR catalyst 131. As a result, it becomes easy for the space for positioning the exhaust gas conversion apparatuses 120 and 130 to be reduced while maintaining NOx conversion efficiency.

The DOC 111 is a honeycomb structural body including a honeycomb unit. The honeycomb unit of the DOC 111 supports a catalyst and has plural through holes divided by partition walls and arranged in a longitudinal direction thereof.

Although the material constituting the honeycomb unit of the DOC 111 is not limited in particular, the material may be cordierite or the like.

Although the catalyst carried by the honeycomb unit of the DOC 111 is not limited in particular, the catalyst may be platinum, palladium, rhodium, or the like. Two or more of them may be used together.

A catalyst support layer may be formed in the honeycomb unit of the DOC 111 for supporting the catalyst.

Although the material constituting the catalyst support layer of the honeycomb unit of the DOC 111 is not limited in particular, the material may be alumina or the like.

Although the holding sealing member 112, 122, 132 is not limited in particular, it is preferable for the holding sealing member 112, 122, 132 to be a mat including an inorganic fiber.

The DPF 121 is also a honeycomb structural body including a honeycomb unit. The honeycomb unit of the DPF 121 has plural through holes divided by partition walls and arranged in a longitudinal direction thereof. The through holes on one end of the honeycomb unit of the DPF 121 are sealed.

Although the material constituting the honeycomb unit of the DPF 121 is not limited in particular, the material may be silicon carbide (SiC), silicon carbide bonded silicon (SiSiC), cordierite, aluminum titanate, etc. However, because silicon carbide (SiC) or silicon carbide bonded silicon (SiSiC) can prevent cracks from being generated even where a large amount of soot remaining in the DPF 121 is burned, it is preferable to use silicon carbide (SiC) or silicon carbide bonded silicon (SiSiC).

The honeycomb unit of the DPF 121 may support an oxide catalyst such as platinum, palladium, rhodium, or the like. With the oxide catalyst, it becomes easy for the temperature for burning the soot remaining in the DPF 121 to be reduced.

On the other hand, with the DPF 121 having a honeycomb unit that does not support a catalyst, it becomes difficult for temperature to increase in correspondence with reactions of a catalyst. Therefore, it becomes easy for the honeycomb unit of the DPF 121 to maintain strength even where the thickness of the partition walls of the honeycomb unit is reduced.

The area of the cross section of the DPF 121 perpendicular to the longitudinal direction is preferably approximately 300 to approximately 1000 cm$^2$, and more preferably approximately 300 to approximately 750 cm$^2$. In a case where the area of the cross section of the DPF 121 perpendicular to the longitudinal direction is approximately 300 cm$^2$ or more, the length of the DPF 121 is not required to be extended for maintaining a volume enough to store soot. Thus, it becomes easy for the space for positioning the exhaust gas conversion apparatus 120 to be reduced. On the other hand, in a case where the cross section of the DPF 121 perpendicular to the longitudinal direction is approximately 1000 cm$^2$ or less, it becomes unnecessary for the DPF 121 is to be equal to or longer than a predetermined length for storing soot. Thus, it becomes easy for the space for positioning the exhaust gas conversion apparatus 120 to be reduced.

It is preferable for the partition wall of the honeycomb unit of the DPF 121 to have a thickness of approximately 0.10 to approximately 0.18 mm. In a case where the thickness of the partition wall of the honeycomb unit of the DPF 121 is approximately 0.10 mm or more, it becomes difficult for the strength of the honeycomb unit of the DPF 121 to decrease. On the other hand, in a case where the thickness of the partition wall of the honeycomb unit of the DPF 121 is approximately 0.18 mm or less, it becomes difficult for the pressure loss of the DPF 121 to increase. As a result, it becomes easy for the space for positioning the exhaust gas conversion apparatus 120 to be reduced.

The SCR catalyst 131 is also a honeycomb structural body including a honeycomb unit. The SCR catalyst 131 has plural through holes divided by partition walls and arranged in a longitudinal direction thereof. The ratio of an area of a cross section of the SCR catalyst 131 perpendicular to a longitudinal direction of the SCR catalyst 131 with respect to an area of a cross section of the DPF 121 perpendicular to a longitudinal direction of the DPF 121 is approximately 0.55 to approximately 0.90, and more preferably approximately 0.70 to approximately 0.90. In a case where the ratio of an area of a cross section of the SCR catalyst 131 perpendicular to a longitudinal direction of the SCR catalyst 131 with respect to an area of a cross section of the DPF 121 perpendicular to a longitudinal direction of the DPF 121 is approximately 0.55 or more, it becomes unnecessary for the length of the SCR catalyst 131 to be extended for maintaining NOx conversion efficiency. Thus, it becomes easy for the space for positioning the exhaust gas conversion apparatus 130 to be reduced. On the other hand, in a case where the ratio of an area of a cross section of the SCR catalyst 131 perpendicular to a longitudinal direction of the SCR catalyst 131 with respect to an area of a cross section of the DPF 121 perpendicular to a longitudinal direction of the DPF 121 is approximately 0.90 or less, it becomes easy for ammonia to be diffused in the radial direction (i.e. toward the outer peripheral part) of the SCR catalyst 131 without maintaining a sufficient distance between the DPF 121 and the SCR catalyst 131.

Figure 2:
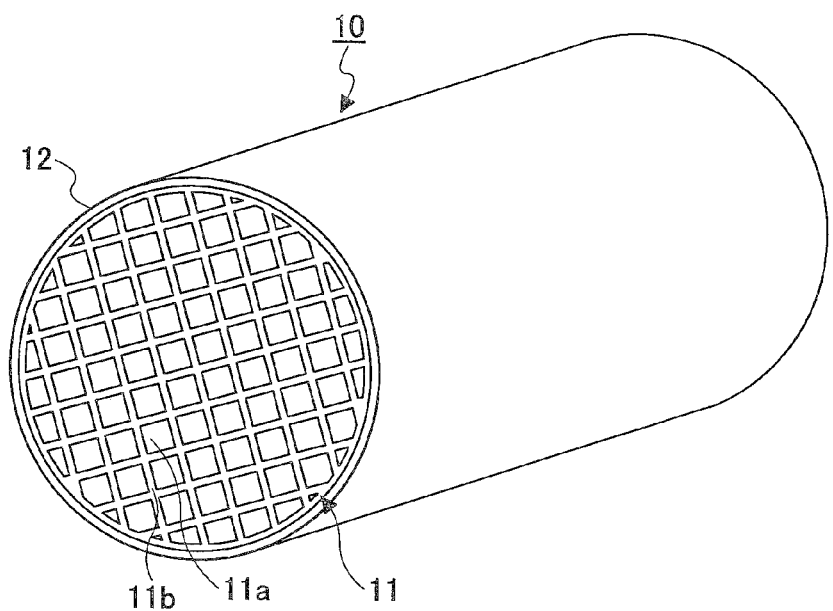
FIG. 2 is a perspective view illustrating an example of an SCR catalyst of FIG. 1.

A honeycomb structural body 10 is illustrated as an example of the SCR catalyst 131 in FIG. 2. The honeycomb structural body 10 includes zeolite and an inorganic binder. The honeycomb structural body 10 has a single honeycomb unit 11 including plural through-holes 11a divided by partition walls 11b and arranged in a longitudinal direction thereof. Further, the honeycomb structural body 10 has an outer peripheral coating layer 12 formed on an outer peripheral surface of the honeycomb unit 11 except for both end faces of the honeycomb unit 11.

Although the zeolite included in the honeycomb unit 11 is not limited in particular, the zeolite may be β type zeolite, ZSM-5 type zeolite, a phosphate group zeolite or the like. Two or more of them may be used together. Among the zeolites, the phosphate zeolite is preferable for attaining a satisfactory NOx conversion efficiency.

The phosphate group zeolite may be a SAPO (e.g., SAPO-5, SAPO-11, SAPO-34 or the like), a MeAPO (metal aluminophosphate), a MeAPSO (metallo-aluminosilicophospate) or the like.

Considering the NOx conversion efficiency, it is preferable for the zeolite to include a zeolite being ion-exchanged with Cu (copper) and/or Fe (iron), and more preferably ion-exchanged with Cu.

The zeolite being ion-exchanged with Cu and/or Fe is preferred to have an ion exchange amount from approximately 1.0 to approximately 5.0 mass %.

It is to be noted that the metal ions used in the ion-exchange of the zeolite are not limited to a Cu ions and/or Fe ions. Other transition metal ions enabling improvement of NOx conversion efficiency may be used.

The average particle diameter of the primary or secondary particles of the zeolite is preferred to be approximately 0.5 to approximately 10 μm, and more preferably approximately 1 to approximately 5 μm. In a case where the average particle diameter of the primary or secondary particles of the zeolite is approximately 0.5 μm or more, it becomes easy for exhaust gas to permeate through the inside of a partition wall 11b such that it becomes easy for the zeolite to be effectively used for NOx conversion. On the other hand, in a case where the average particle diameter of the primary or secondary particles of the zeolite is approximately 10 μm or less, it becomes difficult for the number of pores of the honeycomb unit 11 to decrease. Accordingly, it becomes easy for exhaust gas to permeate through the inside of the partition wall 11b such that it becomes easy for the zeolite to be effectively used for NOx conversion.

The honeycomb unit 11 is preferred to have a zeolite content by weight per apparent volume from approximately 230 to approximately 400 g/L. In a case where the zeolite content by weight per apparent volume is approximately 230 g/L or more, it is unnecessary for the apparent volume of the honeycomb unit 11 to be increased in order to improve the NOx conversion efficiency. On the other hand, in a case where the zeolite content by weight per apparent volume is approximately 400 g/L or less, it becomes difficult for the strength of the honeycomb unit 11 to become insufficient and it becomes difficult for the aperture ratio of the honeycomb unit 11 to decrease.

A solid of, for example, alumina sol, silica sol, titania sol, soluble glass, sepiolite, attapulgite, boehmite or the like may be the inorganic binder(s) included in the honeycomb unit 11. Two or more kinds of inorganic binders may be used.

The content as solid content of the inorganic binder of the honeycomb unit 11 is preferably approximately 5 to approximately 30 mass %, and more preferably approximately 10 to approximately 20 mass %. In a case where the content as solid content of the inorganic binder is approximately 5 mass % or more, it becomes difficult for the strength of the honeycomb unit 11 to decrease. On the other hand, in a case where the content as solid content of the inorganic binder is approximately 30 mass % or less, it does not become difficult to perform extrusion molding of the honeycomb unit 11.

In order to increase the strength of the honeycomb unit 11, it is preferable for the honeycomb unit 11 to further include one or more materials selected from a group of an inorganic fiber, a scale-like material, a tetrapod-shaped material, or a three-dimensional needle-shaped material.

Although the inorganic fiber included in the honeycomb unit 11 is not limited in particular, the inorganic fiber may be alumina fibers, silica fibers, silicon carbide fibers, silica alumina fibers, glass fibers, potassium titanate fibers, aluminum borate fibers or the like. Two or more kinds of inorganic fibers may be used.

The aspect ratio of the inorganic fibers is preferably approximately 2 to approximately 1000, more preferably, approximately 5 to approximately 800, and still more preferably, approximately 10 to approximately 500. In a case where the aspect ratio of the inorganic fibers is approximately 2 or more, it becomes difficult for the effect of increasing the strength of the honeycomb unit 11 to be reduced. On the other hand, in a case where the aspect ratio of the inorganic fibers is more than approximately 1000, it becomes difficult for clogging or the like, for example, to occur in the molding die when performing extrusion molding for forming the honeycomb unit 11. Further, it becomes difficult for breakage of the inorganic fibers to occur, such that it becomes difficult for the effect of increasing the strength of the honeycomb unit 11 to be reduced.

The scale-like material refers to a planar material. It is preferable for the scale-like material to have a thickness of approximately 0.2 μm to approximately 5 μm and a maximum length of approximately 10 μm to approximately 160 μm. The ratio of the maximum length of the scale-like material with respect to the thickness of the scale-like material is preferably approximately 3 to approximately 250.

Although the scale-like material included in the honeycomb unit 11 is not limited in particular, the scale-like material included in the honeycomb unit 11 may be glass, muscovite, alumina, silica or the like. Two or more kinds of the scale-like material may be used.

The tetrapod-shaped material refers to a material having a needle-like part extending three-dimensionally. The average length of the needles of the needle-like part is preferably approximately 5 μm to approximately 30 μm. The average diameter of the needles of the needle-like part is preferably approximately 0.5 μm to approximately 5 μm.

Although the material of the tetrapod-shaped material included in the honeycomb unit 11 is not limited in particular, the material of the tetrapod-shaped material may be zinc oxide or the like. Two or more kinds of the tetrapod-shaped material may be used.

The three-dimensional needle-like material refers to a material including needle-like parts combined to each other by an inorganic compound (e.g., glass) at a center area of the needle-like parts. The average length of the needles of the needle-like parts is preferably approximately 5 μm to approximately 30 μm. The average diameter of the needles of the needle-like parts is preferably approximately 0.5 μm to approximately 5 μm.

Further, the needle-like parts may be connected three-dimensionally. The diameter of the needle-like parts is preferably approximately 0.1 μm to approximately 5 μm, the length of the needle-like parts is preferably approximately 0.3 μm to approximately 30 μm, and the ratio of the length of the needle-like parts to the diameter of the needle-like parts is preferably approximately 1.4 to approximately 50.0.

Although the three-dimensional needle-like material included in the honeycomb unit 11 is not limited in particular, the three-dimensional needle-like material may be alumina, silica, silicon carbide, silica alumina, glass, potassium titanate, aluminum borate, boehmite or the like. Two or more kinds of the three-dimensional needle-like material may be used.

The content of one or more kinds selected from a group of the inorganic fiber, the scale-like material, the tetrapod-shaped material, and the three-dimensional needle-like material in the honeycomb unit 11 is preferably approximately 3 mass % to approximately 50 mass %, more preferably, approximately 3 mass % to approximately 30 mass %, and still more preferably, approximately 5 mass % to approximately 20 mass %. In a case where the content of one or more kinds selected from a group of the inorganic fiber, the scale-like material, the tetrapod-shaped material, and the three-dimensional needle-like material in the honeycomb unit 11 is approximately 3 mass % or more, it becomes difficult for the effect of increasing the strength of the honeycomb unit 11 to be reduced. On the other hand, in a case where the content of one or more kinds selected from a group of the inorganic fiber, the scale-like material, the tetrapod-shaped material, and the three-dimensional needle-like material in the honeycomb unit 11 is approximately 50 mass % or less, it becomes difficult for the content of zeolite in the honeycomb unit 11 to decrease so that it becomes difficult for the NOx conversion efficiency to be reduced.

The porosity of the honeycomb unit 11 is preferably approximately 20% to approximately 50%. In a case where the porosity of the honeycomb unit 11 is approximately 20% or more, it becomes difficult for exhaust gas to permeate into the partition walls 11b. Thus, it becomes easy for zeolite to be effectively used for NOx conversion. On the other hand, in a case where the porosity of the honeycomb unit 11 is approximately 50% or less, it becomes difficult for the strength of the honeycomb unit 11 to become insufficient.

It is to be noted that the porosity of the honeycomb unit 11 can be measured by using a mercury penetration method.

The aperture ratio of a cross section of the honeycomb unit 11 perpendicular to the longitudinal direction of the honeycomb unit 11 is preferably approximately 50% to approximately 75%. In a case where the aperture ratio of the cross section perpendicular to the longitudinal direction of the honeycomb unit 11 is approximately 50% or more, it becomes easy for zeolite to be effectively used for NOx. On the other hand, in a case where the aperture ratio of the cross section perpendicular to the longitudinal direction of the honeycomb unit 11 is approximately 75% or less, it becomes difficult for the strength of the honeycomb unit 11 to become insufficient.

The density of the through-holes 11a of the cross section perpendicular to the longitudinal direction of the honeycomb unit 11 is preferably approximately 31 units per $cm^2$ to approximately 155 units per $cm^2$. In a case where the density of the through-holes 11a of the cross section perpendicular to the longitudinal direction of the honeycomb unit 11 is approximately 31 units per $cm^2$ or more, it becomes easy for exhaust gas and the zeolite to make contact. Thus, it becomes difficult for the NOx conversion efficiency to be reduced. On the other hand, in a case where the density of the through-holes 11a of the cross section perpendicular to the longitudinal direction of the honeycomb unit 11 is approximately 155 units per $cm^2$ or less, it becomes difficult for the pressure loss of the honeycomb structural body 10 to increase.

The thickness of the partition wall 11b of the honeycomb unit 11 is preferably approximately 0.1 mm to approximately 0.4 mm, and more preferably approximately 0.1 mm to approximately 0.3 mm. In a case where the thickness of the partition wall 11b is approximately 0.1 mm or more, it becomes difficult for the strength of the honeycomb unit 11 to decrease. On the other hand, in a case where the thickness of the partition wall 11b is approximately 0.4 mm or less, it becomes easy for exhaust gas to permeate into the partition wall 11b. Thus, it becomes easy for the zeolite to be effectively used for NOx conversion.

The thickness of the outer peripheral coating layer 12 is preferably approximately 0.1 mm to approximately 2.0 mm. In a case where the thickness of the outer peripheral coating layer 12 is approximately 0.1 mm or more, it becomes difficult for the effect of increasing the strength of the honeycomb structural body 10 to become insufficient. On the other hand, in a case where the thickness of the outer peripheral coating layer 12 is approximately 2.0 mm or less, it becomes difficult for the content of the zeolite per volume unit of the honeycomb structural body 10 to be reduced. Thus, the NOx conversion efficiency is reduced.

Although the shape of the honeycomb structure 10 is substantially cylindrical, the shape of the honeycomb structure 10 is not limited in particular. The shape of the honeycomb structure 10 may be a substantially rectangular pillar, a substantially elliptical pillar, a substantially oval pillar, a substantially round chamfered pillar (e.g., substantially round chamfered triangular pillar) or the like.

The shape of the through-holes 11a is not limited to a substantially square pillar. The shape of the through-holes may be a substantially triangular pillar, a substantially hexagonal pillar or the like.

Next, an example of a method for manufacturing the honeycomb structural body 10 according to an embodiment of the present invention is described. First, a raw cylindrical honeycomb molded body, in which plural through-holes separated by walls are formed in parallel in a longitudinal direction, is manufactured by performing extrusion molding using a raw material paste containing zeolite and an inorganic binder (and according to necessity, one or more kinds selected from a group of the inorganic fiber, the scale-like material, the tetrapod-shaped material, and the three-dimensional needle-like material).

Although the inorganic binder contained in the raw material paste is not limited in particular, the inorganic binder is added as alumina sol, silica sol, titania sol, soluble glass, sepiolite, attapulgite, boehmite and the like. Two or more kinds of inorganic binders may be used.

Further, an organic binder, a dispersion medium, a molding aid, and the like may be arbitrarily added to the raw material paste, if necessary.

Although the organic binder is not limited in particular, the organic binder may be methylcellulose, carboxymethyl cellulose, hydroxylethyl cellulose, polyethyleneglycol, phenol resin, epoxy resin or the like. Two or more kinds of organic binders may be used.

The adding amount of the organic binder is preferably approximately 1 mass % to approximately 10 mass % of the total mass of the one or more kinds selected from a group of the zeolite, the inorganic binder, the inorganic fiber, the scale-like material, the scale-like particles, the tetrapod-shaped material, and the three-dimensional needle-like material.

Although the dispersion medium is not limited in particular, the dispersion medium may be water, an organic solvent such as benzene, alcohol such as methanol, and the like. Two or more kinds of dispersion media may be used.

Although the molding aid is not limited in particular, the molding aid may be ethylene glycol, dextrin, fatty acid, fatty acid soap, polyalcohol or the like. Two or more kinds of molding aids may be used.

When preparing the raw material paste, it is preferable for the raw material paste to be mixed and kneaded. The raw material paste can be mixed by using a mixer, an attritor or the like, and can be kneaded by a kneader or the like.

Then, the raw honeycomb molded body is dried by using a drying apparatus such as a microwave drying apparatus, a hot air drying apparatus, a dielectric drying apparatus, a reduced pressure drying apparatus, a vacuum drying apparatus, and a freeze drying apparatus. Thereby, a dried honeycomb body is manufactured.

Further, the dried honeycomb body is degreased. The degreasing conditions can be arbitrarily selected depending on the amount and kind of organic substances contained in the dried honeycomb body. However, the dried honeycomb body is preferably degreased at approximately 400° C. for approximately 2 hours.

Then, by firing the degreased honeycomb body, the honeycomb unit 11 having a substantially cylindrical shape is manufactured. The firing temperature is preferably approximately 600° C. to approximately 1200° C., and more preferably approximately 600° C. to approximately 1000° C. In a case where the firing temperature is approximately 600° C. or more, it becomes easy for the sintering to progress, such that it becomes difficult for the strength of the honeycomb unit 11 to decrease. On the other hand, in a case where the firing temperature is approximately 1200° C. or less, the sintering does not excessively progress such that it becomes difficult for the reactive sites of the zeolite to decrease.

Then, an outer peripheral coating layer paste is applied onto an outer peripheral surface of the substantially cylindrical honeycomb unit 11 except for both end faces of the honeycomb unit 11.

The outer peripheral coating layer paste is not limited in particular. The outer peripheral coating layer paste may be a mixture of an inorganic binder and inorganic particles, a mixture of the inorganic binder and inorganic fibers, a mixture of the inorganic binder, the inorganic particles, and the inorganic fibers or the like.

Although the inorganic binder included in the outer peripheral coating layer paste is not limited in particular, the inorganic binder is added as silica sol, alumina sol, or the like. Two or more kinds of inorganic binders may be used. Among the inorganic binders, it is preferable to add silica sol.

Although the material constituting the inorganic particles of the outer peripheral coating layer paste is not limited in particular, the material may be, for example, a carbide (e.g., silicon carbide), a nitride (e.g., silicon nitride, boron nitride) or the like. Two or more kinds of the inorganic particles may be used. Among the inorganic particles, silicon carbide is preferable because silicon carbide has satisfactory thermal conductivity.

Although the material constituting the inorganic fibers of the outer peripheral coating layer paste is not limited in particular, the inorganic fibers may be silica alumina fibers, mullite fibers, alumina fibers, silica fibers or the like. Two or more kinds of the inorganic fibers may be used. Among the inorganic fibers, alumina fibers are preferable.

The outer peripheral coating layer paste may further include an organic binder.

Although the organic binder included in the outer peripheral coating layer paste is not limited in particular, the organic binder may be polyvinyl alcohol, methylcellulose, ethylcellulose, carboxymethylcellulose or the like. Two or more kinds of the organic binders may be used.

The outer peripheral coating layer paste may further include, for example, balloons (i.e. minute hollow balls of oxide-based ceramic), a pore-forming agent or the like.

Although the balloon included in the outer peripheral coating layer paste is not limited in particular, the balloon may be an alumina balloon, a glass micro balloon, a shirasu-balloon, a fly ash balloon, a mullite balloon or the like. Two or more kinds of the balloons may be used. Among the balloons, alumina balloons are preferable.

Although the pore-forming agent included in the outer peripheral coating layer paste is not limited in particular, the pore-forming agent may be spherical acryl particles, graphite or the like. Two or more kinds of the pore-forming agents may be used.

Then, the honeycomb unit 11 being coated with the outer peripheral coating layer paste is solidified by drying. Thereby, a substantially cylindrical shaped honeycomb structural body 10 is manufactured. In a case where the outer peripheral coating layer paste of the honeycomb structural body 10 contains an organic binder, a degreasing process is preferably performed on the honeycomb structural body 10. The degreasing conditions can be arbitrarily selected depending on the amount and kind of organic substances. However, the degreasing conditions are preferably at approximately 700° C. for approximately 20 minutes.

It is to be noted that zeolite may be ion exchanged by having the honeycomb unit 11 steeped into a solution containing copper ions and/or iron ions. Further, a raw material paste containing zeolite being ion exchanged by copper ions and/or iron ions may be used as the raw material paste.

Figure 3:
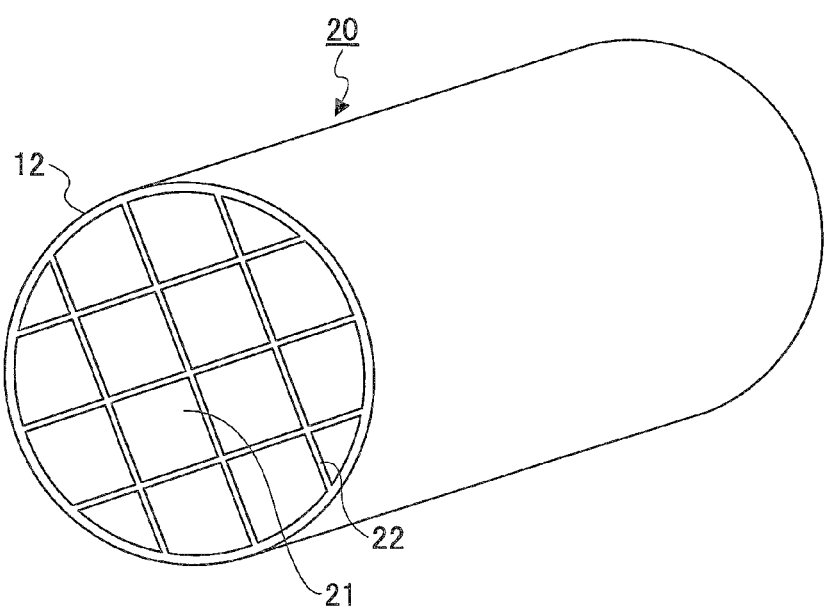
FIG. 3 is a perspective view illustrating other example of the SCR catalyst of FIG. 1.
Figure 4:
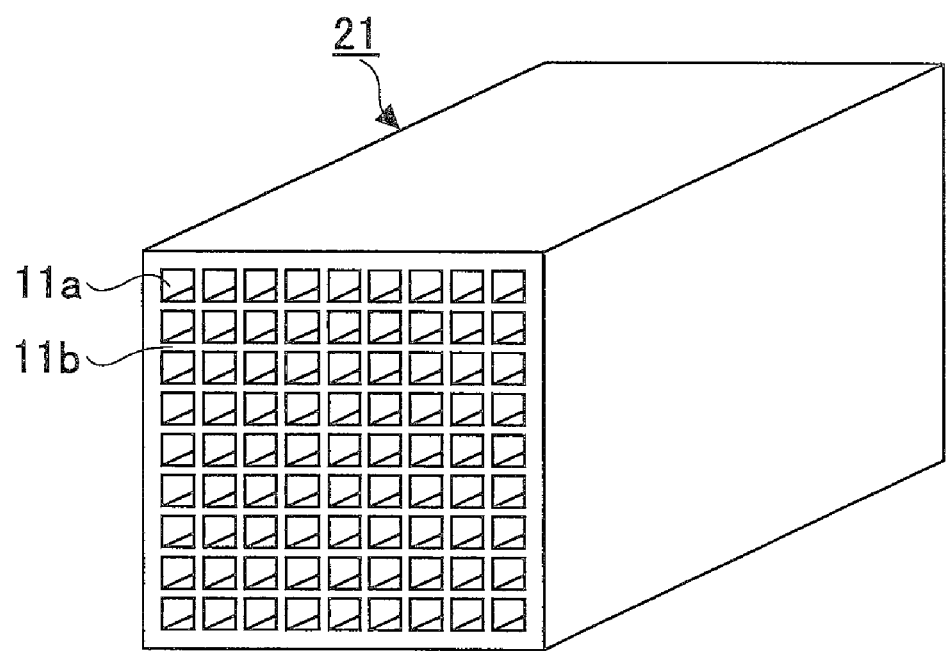
FIG. 4 is a perspective view illustrating a honeycomb unit constituting the SCR catalyst of FIG. 3.

A honeycomb structural body 20 is illustrated as other example of the SCR catalyst 131 in FIG. 3. The honeycomb structural body 20 has the same configuration as the configuration of the honeycomb structural body 10 except that the honeycomb structural body 20 has plural honeycomb units 21 adhered thereto by interposing an adhesive layer 22. Each of the plural honeycomb units 21 includes plural through-holes 11$a$ divided by partition walls 11$b$ and arranged in a longitudinal direction thereof (see FIG. 4).

The cross section of the honeycomb unit 21 perpendicular to the longitudinal direction of the honeycomb unit 21 preferably has an area of approximately 10 $cm^2$ to approximately 200 $cm^2$. In a case where the area of the cross section of the honeycomb unit 21 perpendicular to the longitudinal direction of the honeycomb unit is approximately 10 $cm^2$ or more, it becomes difficult for the pressure loss of the honeycomb structural body 20 to increase. On the other hand, in a case where the area of the cross section of the honeycomb unit 21 perpendicular to the longitudinal direction of the honeycomb unit 21 is approximately 200 $cm^2$ or less, it becomes difficult for the strength against thermal stress of the honeycomb unit 21 to become insufficient.

Other than the cross section of the honeycomb unit 21 perpendicular to the longitudinal direction of the honeycomb unit 21, the honeycomb unit 21 is substantially the same as the honeycomb unit 11.

The thickness of the adhesive layer 22 is preferably approximately 0.5 mm to approximately 2.0 mm. In a case where the thickness of the adhesive layer 22 is approximately 0.5 mm or more, it becomes difficult for the adhesive strength among the honeycomb units 21 to become insufficient. On the other hand, in a case where the thickness of the adhesive layer 22 is approximately 2.0 mm or less, it becomes difficult for the pressure loss of the honeycomb structural body 20 to increase.

Next, an example of a method for manufacturing the honeycomb structural body 20 according to an embodiment of the present invention is described. First, in substantially the same manner as the honeycomb structural body 10, honeycomb units 21 having substantially square pillar shapes are formed. Then, an adhesive layer paste is applied to the outer peripheral surface of the honeycomb units 21 except for both end faces of the honeycomb units 21. Then, the honeycomb units 21 are sequentially adhered together and solidified by drying. Thereby, an aggregate of the honeycomb units 21 can be manufactured.

The adhesive layer paste is not limited in particular. The adhesive layer paste may be a mixture of an inorganic binder and inorganic particles, a mixture of the inorganic binder and inorganic fibers, a mixture of the inorganic binder, the inorganic particles, and the inorganic fibers or the like.

Although the inorganic binder included in the adhesive layer paste is not limited in particular, the inorganic binder is added as silica sol, alumina sol, or the like. Two or more kinds of inorganic binders may be used. Among the inorganic binders, it is preferable to add silica sol.

Although the material constituting the inorganic particles of the adhesive layer paste is not limited in particular, the material may be, for example, a carbide (e.g., silicon carbide), a nitride (e.g., silicon nitride, boron nitride) or the like. Two or more kinds of the inorganic particles may be used. Among the inorganic particles, silicon carbide is preferable because silicon carbide has satisfactory thermal conductivity.

Although the material constituting the inorganic fibers of the adhesive layer paste is not limited in particular, the inorganic fibers may be silica alumina fibers, mullite fibers, alumina fibers, silica fibers or the like. Two or more kinds of the inorganic fibers may be used. Among the inorganic fibers, alumina fibers are preferable.

The adhesive layer paste may further include an organic binder.

Although the organic binder included in the adhesive layer paste is not limited in particular, the organic binder may be polyvinyl alcohol, methylcellulose, ethylcellulose, carboxymethylcellulose or the like. Two or more kinds of the organic binders may be used.

The adhesive layer paste may further include, for example, balloons (i.e. minute hollow balls of oxide-based ceramic), a pore-forming agent or the like.

Although the balloon included in the adhesive layer paste is not limited in particular, the balloon may be an alumina balloon, a glass micro balloon, a shirasu-balloon, a fly ash balloon, a mullite balloon or the like. Two or more kinds of the balloons may be used. Among the balloons, alumina balloons are preferable.

Although the pore-forming agent included in the adhesive layer paste is not limited in particular, the pore-forming agent may be spherical acryl particles, graphite or the like. Two or more kinds of the pore-forming agents may be used.

Then, by cutting the aggregate of honeycomb units 21 into a substantially cylindrical shape (and polishing the aggregate of honeycomb units 21 according to necessity), a substantially cylindrical-shaped aggregate of honeycomb units 21 can be manufactured.

Alternatively, instead of cutting the aggregate of honeycomb units 21 into a substantially cylindrical shape, the substantially cylindrical shaped aggregate of honeycomb units 21 may be manufactured by adhering together honeycomb units 21 each of which having a cross-section perpendicular to the longitudinal direction of the honeycomb unit 21 that is molded into a predetermined shape. In this case, the predetermined shape of the cross-section perpendicular to the longitudinal direction of the honeycomb unit 21 is preferred to be a substantially fan-shape having a central angle of approximately 90°.

Then, an outer peripheral coating layer paste is applied to the outer peripheral surface of the substantially cylindrical-shaped aggregate of honeycomb units 21 except for both end faces of the honeycomb units 21.

The outer peripheral coating layer paste may be, for example, the same as or different from the material of the adhesive layer paste.

Then, the aggregate of the honeycomb units 21 being coated with the outer peripheral coating layer paste is solidified by drying. Thereby, a substantially cylindrical shaped honeycomb structural body 20 is manufactured. In a case where the adhesive layer paste and/or the outer peripheral coating layer paste of the honeycomb structural body 20 contains an organic binder, a degreasing process is preferably performed on the honeycomb structural body 20. The degreasing conditions can be arbitrarily selected depending on the amount and kind of organic substances. However, the degreasing conditions are preferably at approximately 700° C. for approximately 20 minutes.

It is to be noted that the honeycomb structural bodies 10 and 20 may be formed without the outer peripheral coating layer 12.

Alternatively, other honeycomb structural body including a honeycomb unit(s) other than the honeycomb unit 11 or the honeycomb unit 21 may be used. The honeycomb unit of the other honeycomb structural body supports zeolite and has plural through-holes divided by partition walls and arranged in a longitudinal direction thereof.

Although the material constituting the honeycomb unit supporting zeolite is not limited in particular, the material may be cordierite or the like.

Although the zeolite supported on the honeycomb unit 11 is not limited in particular, the zeolite may be β type zeolite, ZSM-5 type zeolite, a phosphate group zeolite or the like. Two or more of them may be used together. Among the zeolites, the phosphate zeolite is preferable for attaining a satisfactory NOx conversion efficiency.

The phosphate group zeolite may be a SAPO (silico aluminophosphate) (e.g., SAPO-5, SAPO-11, SAPO-34 or the like), a MeAPO (metal aluminophosphate), a MeAPSO (metallo-aluminosilicophospate) or the like.

Considering the NOx conversion efficiency, it is preferable for the zeolite to include a zeolite ion-exchanged with Cu (copper) and/or Fe (iron), and more preferably ion-exchanged with Cu.

The zeolite ion-exchanged with Cu and/or Fe is preferred to have an ion exchange amount from approximately 1.0 to approximately 5.0 mass %.

It is to be noted that the metal ions used in the ion-exchange of the zeolite are not limited to Cu ions and/or Fe ions. Other transition metal ions enabling improvement of NOx conversion efficiency may be used.

It is to be noted that an exhaust gas conversion method according to an embodiment of the present invention is a method that is performed by using the above-described embodiment of the exhaust gas conversion apparatus of the present invention. Therefore, specific details of the exhaust gas conversion method according to the embodiment of the present invention are omitted. Examples In the following examples, "parts" refers to "parts by mass".

[DOC-1]

A commercially available cordierite honeycomb structural body that supports an oxide catalyst was used. The honeycomb structural body has a diameter of 228.6 mm and a length of 114.3 mm. The honeycomb structural body has a cylindrical shape.

[DPF-1]

A raw material paste was prepared by performing the following processes: mixing an α type silicon carbide (60 parts) having an average particle diameter of 11 μm and an α type silicon carbide (40 parts) having an average particle diameter of 0.5 μm; then, adding carboxyl methylcellulose (5 parts) and water (10 parts) to the mixture of the α type silicon carbides; then, mixing and kneading the added carboxyl methylcellulose and water with the mixture of the α type silicon carbides; then, adding a small amount of glycerin and a lubricant UNILUB (Trademark) (manufactured by Nippon Oil & Fats Co. Ltd.) to the mixture of the α type silicon carbides, carboxyl methylcellulose, and water; and then, mixing and kneading the added glycerin and lubricant with the mixture of the α type silicon carbides, carboxyl methylcellulose, and water.

Then, extrusion molding was performed on the raw material paste by using an extruder. Thereby, a cylindrical-shaped honeycomb molded body was manufactured. Then, the honeycomb molded body was dried by using a microwave drying apparatus and a hot air drying apparatus. Thereby, a dried honeycomb body was manufactured.

Then, the through-holes of one side of the dried honeycomb body were filled with the raw material paste. Then, the dried honeycomb body filled with the raw material paste was further dried by the microwave drying apparatus and the hot air drying apparatus. After the drying, the dried honeycomb body was degreased. Then, the degreased honeycomb body was fired at 2200° C. for 3 hours. Thereby, a honeycomb unit is manufactured having a quadrate pillar-shape whose single side is 34.3 mm and length is 203.2 mm. In the honeycomb unit, the density of the through holes was 46.5 units/cm$^2$, the thickness of the partition walls was 0.15 mm, the average pore diameter of the honeycomb unit was 11 μm, and the porosity of the honeycomb unit was 42%.

Then, an adhesive layer paste was prepared by mixing and kneading an alumina fiber (30 parts) having an average fiber diameter of 20 μm, a silicon carbide (21 parts) having an average particle diameter of 0.6 μm, silica sol (15 parts) of 30 mass % as solid content, carboxyl methylcellulose (5.6 parts), and water (28.4 parts).

Then, 36 honeycomb units were adhered together by applying the adhesive layer paste to the outer peripheral surface of the honeycomb units except for the outer peripheral surface of both end parts of the honeycomb units. The adhesive layer paste was applied so that the thickness of the adhesive layer is 1.0 mm. The adhesive layer paste was solidified by drying at a temperature of 120° C. Then, an aggregate of the honeycomb units was manufactured by cutting the honeycomb units into a cylindrical shape with a diamond cutter so that the cross section perpendicular to the longitudinal direction of the honeycomb units becomes substantially point symmetrical.

Then, an outer peripheral surface coating layer paste was prepared by mixing and kneading a silica-alumina fiber (23.3 parts) having an average fiber diameter of 50 μm, a silicon carbide (30.2 parts) having an average particle diameter of 0.3 μm, silica sol (7 parts) of 30 mass % as solid content, carboxyl methylcellulose (0.5 parts), and water (39 parts).

Then, the outer peripheral surface coating layer paste was applied to the outer peripheral surface of the aggregate of the honeycomb units except for the outer peripheral surface of both end parts of the aggregate of honeycomb units. The outer peripheral surface coating layer paste was solidified by drying the outer peripheral surface coating layer paste at 120° C. Thereby, a honeycomb structural body having a cylindrical shape with a diameter of 228.6 mm and a length of 203.2 mm was manufactured.

[DPF-2]

A commercially available cordierite honeycomb structural body having a single honeycomb unit was used. With this honeycomb structural body, the through-holes on one end of the honeycomb unit of the honeycomb structural body are sealed. The honeycomb structural body has a diameter of 228.6 mm and a length of 279.4 mm. The honeycomb structural body has a cylindrical shape. An outer peripheral coating layer having a thickness of 0.2 mm was formed on the outer peripheral surface of the honeycomb unit except for the outer peripheral surface of both end parts of the honeycomb unit. In the honeycomb unit, the density of the through holes was 46.5 units/cm$^2$, the thickness of the partition walls was 0.30 mm, the average pore diameter of the honeycomb unit was 15 μm, and the porosity of the honeycomb unit was 48%. The honeycomb unit does not have catalyst supported thereon.

[SCR Catalyst-1]

A raw material paste was prepared as zeolite by mixing and kneading: SAPO (3100 g) having an average particle diameter of 3 μm as zeolite; boehmite (895 g); alumina fiber (485 g) having an average fiber diameter of 6 μm and an average fiber length of 100 μm; methylcellulose (380 g); oleic acid (280 g); and ion exchanged water (2425 g).

Then, extrusion molding was performed on the raw material paste by using an extruder. Thereby, a cylindrical-shaped honeycomb molded body was manufactured. Then, the honeycomb molded body was dried for 10 minutes at 110° C. by using a microwave drying apparatus and a hot air drying apparatus. Then, the dried honeycomb body was degreased at 400° C. for 5 hours. Then, the degreased honeycomb body was fired at 700° C. for 2 hours. Thereby, a honeycomb unit was manufactured.

Then, the above-described outer peripheral coating layer paste was applied to the outer peripheral surface of the fired honeycomb body except for the outer peripheral surface of both end parts of the fired honeycomb body. The outer peripheral coating layer paste was applied so that the thickness of the outer peripheral coating layer is 0.2 mm. The outer peripheral coating layer paste was solidified by drying at a temperature of 120° C. Thereby, a honeycomb structural body was manufactured. Further, zeolite (SAPO) of the honeycomb structural body was ion exchanged with copper ions by steeping the honeycomb structural body into a copper nitrate solution. Thereby, the honeycomb structural body 10 was manufactured. In measuring the exchange amount of copper ions of the zeolite (SAPO) by performing ICP (Inductively Coupled Plasma) analysis with an ICPS-8100 (manufactured by Shimadzu Corp.), 2.7 mass % was measured. The honeycomb structural body 10 has a cylindrical shape with a diameter of 228.6 mm and a length of 203.2 mm. In the honeycomb unit 11 of the honeycomb structural body 10, the thickness of the partition walls was 0.28 mm and the density of the through holes was 62 units/cm$^2$.

[SCR Catalyst-2]

The same as the SCR catalyst-1, a cylindrical shaped honeycomb structural body having a diameter of 190.5 mm and a length of 292.1 mm was manufactured.

[SCR Catalyst-3]

A commercially available cordierite honeycomb structural body was steeped in a dispersion of zeolite (SAPO) being ion exchanged with copper ions of 2.7 mass %. Thereby, zeolite (SAPO) of 70 g/L was supported on the honeycomb structural body. The honeycomb structural body includes a single honeycomb unit. The honeycomb structural body has a cylindrical shape with a diameter of 228.6 mm and a length of 304.8 mm. An outer peripheral coating layer having a thickness of 0.2 mm is formed on the outer peripheral surface of the honeycomb unit except for the outer peripheral surface of both end parts of the honeycomb unit. In the honeycomb unit of the honeycomb structural body, the thickness of the partition walls was 0.28 mm and the density of the through holes was 62 units/cm$^2$. [SCR Catalyst-4]

A commercially available cordierite honeycomb structural body was steeped in a dispersion of zeolite (SAPO) ion exchanged with copper ions of 2.7 mass %. Thereby, zeolite (SAPO) of 70 g/L was supported on the honeycomb structural body. The honeycomb structural body includes a single honeycomb unit. The honeycomb structural body has a cylindrical shape with a diameter of 190.5 mm and a length of 439.4 mm. An outer peripheral coating layer having a thickness of 0.2 mm is formed on the outer peripheral surface of the honeycomb unit except for the outer peripheral surface of both end parts of the honeycomb unit. In the honeycomb unit of the honeycomb structural body, the thickness of the partition walls was 0.28 mm and the density of the through holes was 62 units/cm$^2$.

EXAMPLE 1

The DOC-1, the DPF-1, and the SCR catalyst-2 were used as the DOC 111, the DPF 121, and the SCR catalyst 131, respectively. The exhaust gas conversion system 100 (see FIG. 1) was manufactured by arranging the DOC 111, the DPF 121, and the SCR catalyst 131 in a manner that the distance between the DOC 111 and the DPF 121 is 200 mm and the distance between the DPF 121 and the SCR catalyst 131 is 550 mm. In this example, an ejection nozzle for ejecting urea water was set at a position in which the distance from the DPF 121 is 200 mm.

EXAMPLE 2

Except for using the DPF-2 as the DPF 121, the exhaust gas conversion system 100 was manufactured under the same conditions as those of Example 1.

EXAMPLE 3

Except for using the SCR catalyst-4 as the SCR catalyst 131, the exhaust gas conversion system 100 was manufactured under the same conditions as those of Example 1.

COMPARATIVE EXAMPLE 1

Except for using the SCR catalyst-1 as the SCR catalyst 131 and setting the position of the DPF 121 and the SCR 131 so that the distance between the DPF 121 and the SCR 131 is 800 mm, an exhaust gas conversion system was manufactured under the same conditions as those of Example 1.

COMPARATIVE EXAMPLE 2

Except for setting the position of the DPF 121 and the SCR 131 so that the distance between the DPF 121 and the SCR 131 is 950 mm, an exhaust gas conversion system was manufactured under the same conditions as those of Example 1.

COMPARATIVE EXAMPLE 3

Except for using the SCR catalyst-1 as the SCR catalyst 131 and setting the position of the DPF 121 and the SCR 131 so that the distance between the DPF 121 and the SCR 131 is 950 mm, an exhaust gas conversion system was manufactured under the same conditions as those of Example 1.

COMPARATIVE EXAMPLE 4

Except for using the SCR catalyst-3 as the SCR catalyst 131 and setting the position of the DPF 121 and the SCR 131 so that the distance between the DPF 121 and the SCR 131 is 950 mm, an exhaust gas conversion system was manufactured under the same conditions as those of Example 1.

[Measurement of NOx Conversion Rate]

The conversion rate of NOx contained in an exhaust gas emitted from an engine having an air volume displacement of 4.2 L was measured by using the exhaust gas conversion systems of Examples 1 to 3 and Comparative Examples 1 to 4.

It is to be noted that the NOx conversion rate was measured by setting NOx sensors on the upstream sides and downstream sides of the SCR catalyst 131 with respect to the direction in which the exhaust gas flows, detecting the concentration of NOx inside the exhaust gas with the NOx sensors for 30 minutes, and obtaining the average value with the following formula.

$$\text{NOx conversion rate} = (\text{NoX inflow} - \text{Nox outflow})/(\text{NOx inflow}) \times 100\%$$

The measurement of the NOx conversion rate was performed under the conditions where the engine is in a steady operation state and the exhaust gas has a temperature of 250° C. Further, urea water was ejected inside the pipe 150 from an ejection nozzle so that the mol ratio of ammonia with respect to NOx detected by the NOx sensor of the upstream side of the SCR catalyst 131 becomes 1 when the temperature of the SCR catalyst 131 is equal to or higher than 180° C. Further, the urea water is diffused in the radial direction of the pipe 150 by using a mixer and a swirler.

The lengths of the exhaust gas conversion systems and the results of the NOx conversion rate measurement are illustrated in Table 1 together with various kinds of DOC, DPF, and SCR catalyst.

TABLE 1

|  | DOC | DPF | SCR CATALYST | CROSS-SECTIONAL RATIO OF SCR CATALYST WITH RESPECT TO DPF | LENGTH OF EXHAUST GAS CONVERSION SYSTEM [mm] | CONVERSION RATE OF NOx [%] |
|---|---|---|---|---|---|---|
| EXAMPLE 1 | DOC-1 | DPF-1 | SCR CATALYST-2 | 0.69 | 1360 | 86 |
| EXAMPLE 2 | DOC-1 | DPF-2 | SCR CATALYST-2 | 0.69 | 1436 | 84 |
| EXAMPLE 3 | DOC-1 | DPF-1 | SCR CATALYST-4 | 0.69 | 1507 | 73 |
| COMPARATIVE EXAMPLE 1 | DOC-1 | DPF-1 | SCR CATALYST-1 | 1.00 | 1521 | 47 |
| COMPARATIVE EXAMPLE 2 | DOC-1 | DPF-1 | SCR CATALYST-1 | 1.00 | 1671 | 78 |
| COMPARATIVE EXAMPLE 3 | DOC-1 | DPF-2 | SCR CATALYST-1 | 1.00 | 1696 | 76 |
| COMPARATIVE EXAMPLE 4 | DOC-1 | DPF-1 | SCR CATALYST-3 | 1.00 | 1696 | 70 |

The cross-sectional ratio of SCR with respect to DPF of the Examples 1 to 3 and Comparative Examples 1 to 4 was 0.69, 0.69, 0.69, 1.00, 1.00, 1.00, and 1.00, respectively. The NOx conversion rate of Examples 1 to 3 and Comparative Examples 1 to 4 was 86%, 84%, 73%, 47%, 78%, 76%, and 70%, respectively.

It is to be noted that "cross-sectional ratio of SCR catalyst with respect to DPF" indicates the ratio of an area of a cross section of an SCR catalyst perpendicular to a longitudinal direction of the SCR catalyst with respect to an area of a cross section of a DPF perpendicular to a longitudinal direction of the DPF. Further, "length of exhaust gas conversion system" indicates the distance from an end part on an upstream side of the SCR catalyst 122 to an end part on a downstream side of the DOC 111 with respect to the direction in which the exhaust gas flows.

As illustrated in Table 1, it can be understood that the exhaust gas conversion systems of Examples 1 to 3 can be formed with a length of 1360 mm to 1507 mm while maintaining a NOx conversion rate of 73% to 86%.

On the other hand, with the exhaust gas conversion system of Comparative Example 1, the NOx conversion rate is reduced to 47% where the length of the exhaust gas conversion system is 1521 mm.

Further, with the exhaust gas conversion system of Comparative Examples 2 to 4, although the NOx conversion rate is 70% to 78%, the length of the exhaust gas conversion systems is increased to 1671 mm to 1696 mm.

Obviously, numerous modifications and variations of the present invention are possible in light of the above teachings. It is therefore to be understood that within the scope of the appended claims,ature invention may be practiced otherwise than as specifically described herein.

The invention claimed is:

1. An exhaust gas conversion system comprising:
an oxide catalyst;
a filter having a honeycomb structural body including a honeycomb unit having a plurality of through holes divided by partition walls and arranged in a longitudinal direction of the honeycomb unit, the plurality of through holes being sealed on one end of the honeycomb unit in the longitudinal direction,
a selective catalytic reduction catalyst having a honeycomb structural body including a honeycomb unit having a plurality of through holes divided by partition walls and arranged in a longitudinal direction of the honeycomb unit, the oxide catalyst, the filter and the selective catalytic reduction catalyst being sequentially arranged in a direction in which an exhaust gas flows in an exhaust path of a diesel engine; and
an ammonia supplying device positioned between the filter and the selective catalytic reduction catalyst and configured to supply ammonia,
wherein a ratio of an area of a cross section of the selective catalytic reduction catalyst perpendicular to a longitudinal direction of the selective catalytic reduction catalyst with respect to an area of a cross section of the filter perpendicular to a longitudinal direction of the filter is approximately 0.55 or more and approximately 0.90 or less, and
wherein the area of the cross section of the filter perpendicular to the longitudinal direction of the filter is approximately 300 cm$^2$ or more and approximately 1000 cm$^2$ or less.

2. The exhaust gas conversion system as claimed in claim 1, wherein the honeycomb unit included in the selective catalytic reduction catalyst includes zeolite and an inorganic binder.

3. The exhaust gas conversion system as claimed in claim 2, wherein the zeolite includes a phosphate group zeolite.

4. The exhaust gas conversion system as claimed in claim 2, wherein the zeolite includes a zeolite obtained by ion-exchange with Cu or Fe.

5. The exhaust gas conversion system as claimed in claim 1, wherein the honeycomb unit included in the selective catalytic reduction catalyst includes an inorganic fiber, a scale-like material, a tetrapod-shaped material, a three-dimensional needle-shaped material or a combination thereof.

6. The exhaust gas conversion system as claimed in claim 1, wherein the selective catalytic reduction catalyst includes a plurality of the honeycomb units.

7. The exhaust gas conversion system as claimed in claim 1, wherein the honeycomb unit included in the filter includes silicon carbide or silicon carbide bonded silicon.

8. The exhaust gas conversion system as claimed in claim 1, wherein each of the partition walls of the honeycomb unit has a thickness of approximately 0.10 mm or more and approximately 0.18 mm or less.

9. The exhaust gas conversion system as claimed in claim 1, wherein the oxide catalyst is canned in a first metal container in a state where a first holding sealing member is provided at an outer peripheral part of the oxide catalyst, wherein the filter is canned in a second metal container in a state where a second holding sealing member is provided at an outer peripheral part of the filter, wherein the selective catalytic reduction catalyst is canned in a third metal container in a state where a third holding sealing member is provided at an outer peripheral part of the selective catalytic reduction catalyst.

10. The exhaust gas conversion system as claimed in claim 1, wherein the ammonia supplying device is an injection nozzle to inject ammonia or a compound that generates ammonia by being decomposed.

11. The exhaust gas conversion system as claimed in claim 10, wherein the compound that generates ammonia by being decomposed is urea water.

12. The exhaust gas conversion system as claimed in claim 1, wherein the oxide catalyst has a honeycomb structural body including a honeycomb unit that supports a catalyst and has a plurality of through holes divided by partition walls and arranged in a longitudinal direction of the honeycomb unit.

13. The exhaust gas conversion system as claimed in claim 12, wherein a material constituting the honeycomb unit included in the oxide catalyst is cordierite.

14. The exhaust gas conversion system as claimed in claim 1, wherein a material constituting the honeycomb unit included in the filter is silicon carbide, silicon carbide bonded silicon, cordierite, or aluminum titanate.

15. The exhaust gas conversion system as claimed in claim 1, wherein the selective catalytic reduction catalyst has a single honeycomb unit.

16. The exhaust gas conversion system as claimed in claim 2, wherein the zeolite is a β type zeolite, a ZSM-5 type zeolite, or a phosphate group zeolite.

17. The exhaust gas conversion system as claimed in claim 16, wherein the phosphate group zeolite is a SAPO (silico aluminophosphate), a MeAPO (metal aluminophosphate), or a MeAPSO (metallo-aluminosilicophospate).

18. The exhaust gas conversion system as claimed in claim 17, wherein the SAPO is SAPO-5, SAPO-11 or SAPO-34.

19. The exhaust gas conversion system as claimed in claim 1, wherein the selective catalytic reduction catalyst has a plurality of the honeycomb units and each of the plurality of the honeycomb units is adhered to each other by interposing an adhesive layer.

20. The exhaust gas conversion system as claimed in claim 19, wherein each of the plurality of the honeycomb units included in the selective catalytic reduction catalyst has a cross-section perpendicular to the longitudinal direction of the honeycomb unit that is substantially a fan-shape having a central angle of approximately 90°.

21. The exhaust gas conversion system as claimed in claim 1, wherein the honeycomb unit included in the selective catalytic reduction catalyst supports a zeolite.

22. The exhaust gas conversion system as claimed in claim 21, wherein a material constituting the honeycomb unit included in the selective catalytic reduction catalyst is cordierite.

23. The exhaust gas conversion system as claimed in claim 22, wherein the zeolite is a β type zeolite, a ZSM-5 type zeolite, or a phosphate group zeolite.

24. The exhaust gas conversion system as claimed in claim 23, wherein the phosphate group zeolite is a SAPO (silico aluminophosphate), a MeAPO (metal aluminophosphate), or a MeAPSO (metallo-aluminosilicophospate).

25. The exhaust gas conversion system as claimed in claim 24, wherein the SAPO is SAPO-5, SAPO-11 or SAPO-34.

26. The exhaust gas conversion system as claimed in claim 2, wherein the zeolite is obtained by ion-exchange with copper, iron or a combination of copper and iron.

27. An exhaust gas conversion method comprising:
converting an exhaust gas by using the exhaust gas conversion system claimed in claim 1.

28. The exhaust gas conversion method as claimed in claim 27, wherein the honeycomb unit included in the selective catalytic reduction catalyst includes zeolite and an inorganic binder.

29. The exhaust gas conversion method as claimed in claim 28, wherein the zeolite includes a phosphate group zeolite.

30. The exhaust gas conversion method as claimed in claim 28, wherein the zeolite includes a zeolite obtained by ion-exchange with copper or iron.

31. The exhaust gas conversion method gas as claimed in claim 27, wherein the honeycomb unit included in the selective catalytic reduction catalyst includes an inorganic fiber, a scale-like material, a tetrapod-shaped material, a three-dimensional needle-shaped material, or a combination thereof.

32. The exhaust gas conversion method as claimed in claim 27, wherein the selective catalytic reduction catalyst includes a plurality of the honeycomb units.

33. The exhaust gas conversion method as claimed in claim 27, wherein the honeycomb unit included in the filter includes silicon carbide or silicon carbide bonded silicon.

34. The exhaust gas conversion method as claimed in claim 27, wherein each of the partition walls of the honeycomb unit has a thickness of approximately 0.10 mm or more and approximately 0.18 mm or less.

35. The exhaust gas conversion method as claimed in claim 27, wherein the oxide catalyst is canned in a first metal container in a state where a first holding sealing member is provided at an outer peripheral part of the oxide catalyst, wherein the filter is canned in a second metal container in a state where a second holding sealing member is provided at an outer peripheral part of the filter, wherein the selective catalytic reduction catalyst is canned in a third metal container in a state where a third holding sealing member is provided at an outer peripheral part of the selective catalytic reduction catalyst.

36. The exhaust gas conversion method as claimed in claim 27, wherein the ammonia supplying device is an injection nozzle to inject ammonia or a compound that generates ammonia by being decomposed.

37. The exhaust gas conversion method as claimed in claim 36, wherein the compound that generates ammonia by being decomposed is urea water.

38. The exhaust gas conversion method as claimed in claim 27, wherein the oxide catalyst has a honeycomb structural body including a honeycomb unit that supports a catalyst and has a plurality of through holes divided by partition walls and arranged in a longitudinal direction of the honeycomb unit.

39. The exhaust gas conversion method as claimed in claim 38, wherein a material constituting the honeycomb unit included in the oxide catalyst is cordierite.

40. The exhaust gas conversion method as claimed in claim 27, wherein a material constituting the honeycomb unit included in the filter is silicon carbide, silicon carbide bonded silicon, cordierite, or aluminum titanate.

41. The exhaust gas conversion method as claimed in claim 27, wherein the selective catalytic reduction catalyst has a single honeycomb unit.

42. The exhaust gas conversion method as claimed in claim 28, wherein the zeolite is a β type zeolite, a ZSM-5 type zeolite, or a phosphate group zeolite.

43. The exhaust gas conversion method as claimed in claim 42, wherein the phosphate group zeolite is a SAPO (silico aluminophosphate), a MeAPO (metal aluminophosphate), or a MeAPSO (metallo-aluminosilicophospate).

44. The exhaust gas conversion method as claimed in claim 43, wherein the SAPO is SAPO-5, SAPO-11 or SAPO-34.

45. The exhaust gas conversion method as claimed in claim 27, wherein the selective catalytic reduction catalyst has a plurality of the honeycomb units and each of the plurality of the honeycomb units is adhered to each other by interposing an adhesive layer.

46. The exhaust gas conversion method as claimed in claim 45, wherein each of the plurality of the honeycomb units included in the selective catalytic reduction catalyst has a cross-section perpendicular to the longitudinal direction of the honeycomb unit that is substantially a fan-shape having a central angle of approximately 90°.

47. The exhaust gas conversion method as claimed in claim 27, wherein the honeycomb unit included in the selective catalytic reduction catalyst supports a zeolite.

48. The exhaust gas conversion method as claimed in claim 47, wherein a material constituting the honeycomb unit included in the selective catalytic reduction catalyst is cordierite.

49. The exhaust gas conversion method as claimed in claim 48, wherein the zeolite is a β type zeolite, a ZSM-5 type zeolite, or a phosphate group zeolite.

50. The exhaust gas conversion method as claimed in claim 49, wherein the phosphate group zeolite is a SAPO (silico aluminophosphate), a MeAPO (metal aluminophosphate), or a MeAPSO (metallo-aluminosilicophospate).

51. The exhaust gas conversion method as claimed in claim 50, wherein the SAPO is SAPO-5, SAPO-11 or SAPO-34.

52. The exhaust gas conversion method as claimed in claim 28, wherein the zeolite is obtained by ion-exchange with copper, iron or a combination of copper and iron.

* * * * *